3 Sheets--Sheet 1.

H. W. JEWETT & R. A. ARMSTRONG.
Saw-Gummers and Sharpeners.

No. 156,163. Patented Oct. 20, 1874.

Witnesses:
Frank H. Jordan
Charles E. Clifford

Inventors:
Hartley W. Jewett
Robert A. Armstrong
per
Wm. Henry Clifford
atty.

3 Sheets--Sheet 2.

H. W. JEWETT & R. A. ARMSTRONG.
Saw-Gummers and Sharpeners.

No. 156,163. Patented Oct. 20, 1874.

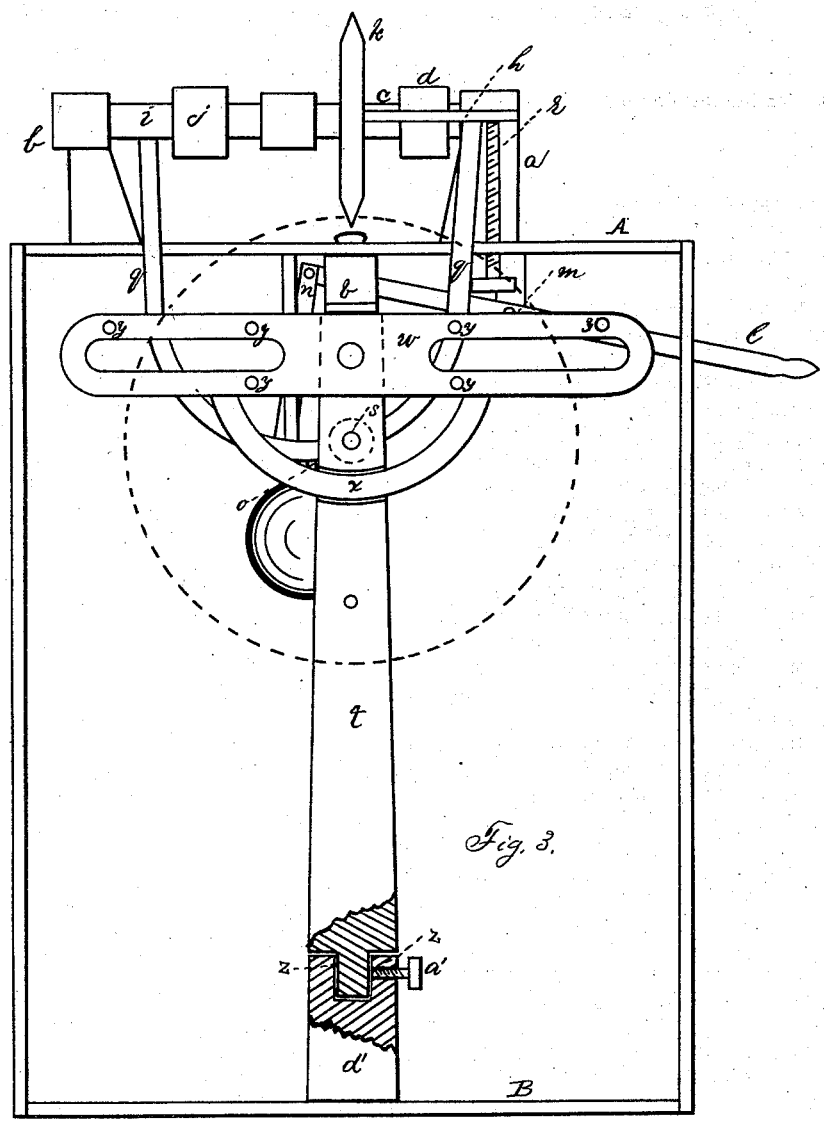

UNITED STATES PATENT OFFICE.

HARTLEY W. JEWETT, OF FARMINGDALE, AND ROBERT A. ARMSTRONG, OF GARDINER, MAINE.

IMPROVEMENT IN SAW GUMMERS AND SHARPENERS.

Specification forming part of Letters Patent No. 156,163, dated October 20, 1874; application filed June 24, 1874.

*To all whom it may concern:*

Be it known that we, HARTLEY W. JEWETT, of Farmingdale, in the county of Kennebec and State of Maine, and ROBERT A. ARMSTRONG, of Gardiner, in the county of Kennebec and State of Maine, have invented certain new and useful Improvements in Saw Gummers and Sharpeners; and we do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
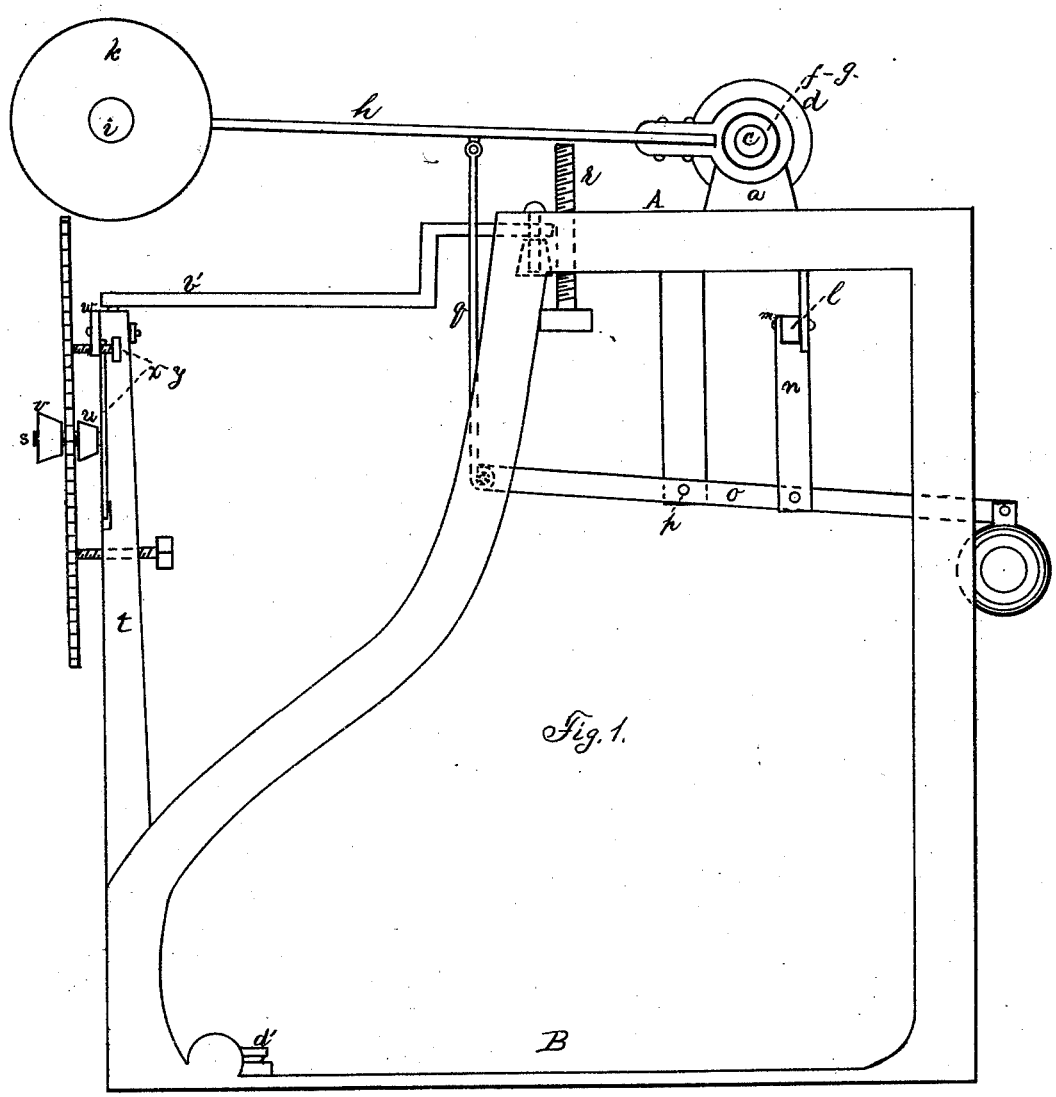
Figure 2:
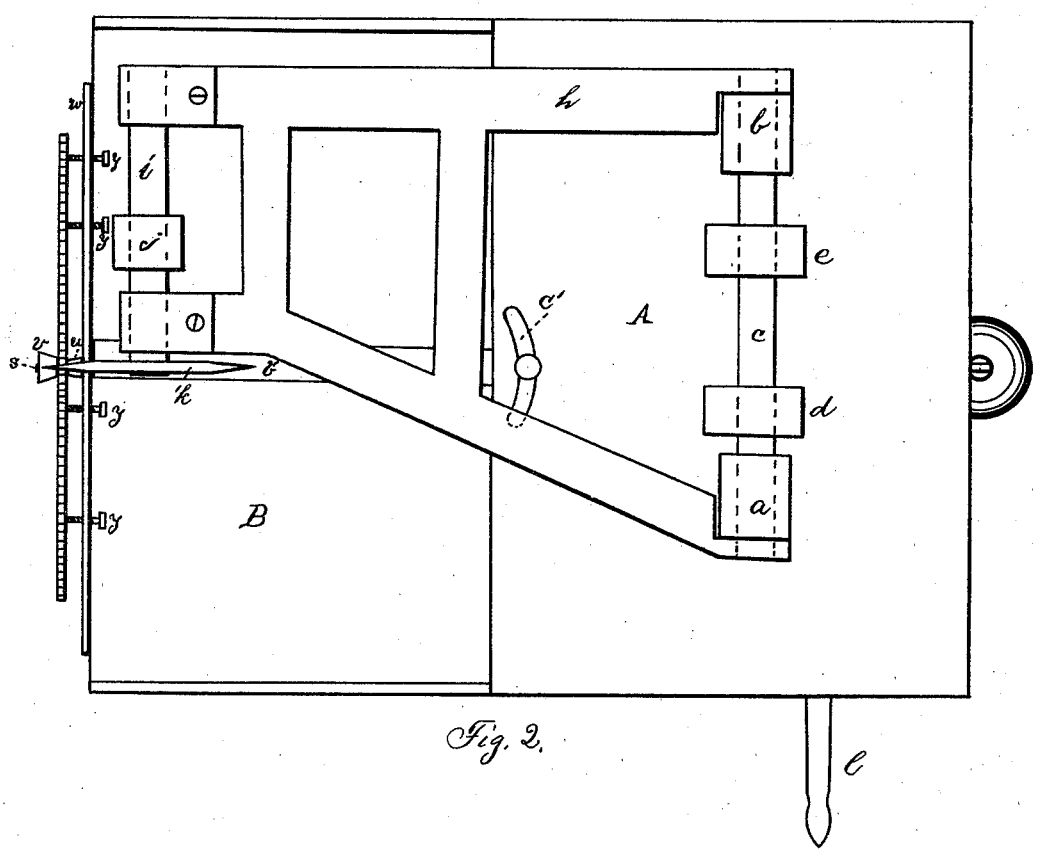

Figure 1 is a side elevation; Fig. 2, a top plan; Fig. 3, an end elevation, saw removed.

The same letters show like parts.

The purpose of our invention is to provide a machine for grinding or sharpening saws of various kinds.

The devices are set upon a proper frame or table, A, having a base, B. Upon the top of the table are fixed two bearings, $a$ $b$. Into these bearings is set the shaft $c$, having the fast pulleys $d$ and $e$. On the outer sides of the bearings $a$ and $b$ are set two short cylindrical shafts or sleeves, $f$ $g$. Upon these is hung the frame $h$. On its outer end this frame carries the shaft $i$, having a fixed pulley, $j$. Set on this shaft $i$, also, is the grinding-wheel $k$. We use preferably an emery-wheel. This frame is susceptible of a vertical motion in order to bring the wheel in contact with the saw to be sharpened, or to lift it up away from the same. The frame is brought down so as to bring the emery-wheel in contact with the saw, by means of the lever $l$. This lever is pivoted at $m$ on the under side of the top of the table A. On its outer end it carries the arm $n$ pivoted to the lever $a$, which, in its turn, is pivoted at $p$, and its forward end is pivoted to the yoke $q$, which yoke is connected with the frame $h$. By pressing downwardly on the lever $l$ the emery-wheel may be brought in contact with the saw to be sharpened. When the power is removed from the lever $l$ the weight on the other end of the lever $o$ will elevate the frame $h$, and so lift the wheel from the saw. An adjustable stop, $r$, determines the extent to which the frame $h$ can be depressed, and enables the operator to fit the wheel accurately to the saw. The saw to be sharpened is placed upon a stud, $s$, projecting from the standard $t$. Upon this standard is a washer, $u$, which holds the saw at the proper distance from the standard. The saw is held confined upon the stud $s$ by the nut or other equivalent contrivance $v$. Pivoted near the top of the standard is the adjustable bearing-plate $w$. This plate is capable of a motion by itself in a vertical plane, in order that it may be applied or adjusted to the face of a saw, as may be desired. It carries a segment, $x$, which slides in a socket in the standard $t$, so as to insure a true vertical motion and position to the bearing-plate. Through the bearing-plate work adjusting-screws $y$, and also through the standard $t$. These screws are to bear against the surface of the saw, hold it firmly and rigidly, and prevent its bending or vibrating while being operated upon by the grinding-wheel. The standard $t$ can be turned horizontally on its lower end, having there a tenon to fit the socket $z$, and when so turned can be held in any position by the set-screw $a'$. Pivoted to the top of the standard $t$ is a brace, $b'$, which extends back to the table of the machine, and there has a stud sliding in a curved slot, $c'$. This brace $b'$ both strengthens the standard $t$ and regulates to a certain extent the distance to which the standard $t$ and the bearing-plate $w$ can be turned in a horizontal plane. This turning of the standard $t$ and the bearing-plate $w$ carries with them, of course, the saw to be sharpened, when placed on the stud $s$, and it is done for the purpose of imparting the desired bevel to the edges of the saw-teeth across the thickness of the saw-plate. The socket $z$ of the standard $t$ rests on a foot, $d'$, which is fastened to the base B by means of a screw and slot. This enables the standard to be moved from or toward the table of the machine. There may be a slot and set-screw in the brace $b'$, which will also admit of the like movement of the standard $t$.

From the arrangement of this machine it will be perceived that the workman may stand behind and away from the saw while being sharpened, and will thus be exempted from those injurious conseqences which result from the inhalation of the fine filings produced in the operation of grinding the saw.

Saws of any kind, it is plain, may be operated upon in this machine, and when placed upon the standard and held by the bearing-plate and the screws are kept from bending or shaking during the operation.

It is evident that the desired bevel can be accurately given to the edges of the saw-teeth by the turning of the standard and its bearing-plate.

The pointed shape is imparted to the teeth by the shape of the grinding-surfaces of the wheel.

C is a detail view of the foot, showing the slot and screw.

What we claim as our invention, and desire to secure by Letters Patent, is—

1. The combination of the standard $t$, stud $s$, plate $w$, screws $y\ y$, socket $z$, and brace $b'$, as herein set forth.

2. The combination of the adjustable foot $d'$, standard $t$, having the socket $z$, brace $b'$, and slot $c'$, substantially in the manner and for the purposes set forth.

In testimony that we claim the foregoing as our own we affix our signatures in presence of two witnesses.

HARTLEY W. JEWETT.
  ROBERT A. ARMSTRONG.

Witnesses:
  GEORGE H. WOODWARD,
  I. W. WOODWARD.